T. A. BATEMAN.
REMOVABLE TOOTH FOR THRESHING MACHINE CYLINDERS.
APPLICATION FILED OCT. 19, 1911.
1,033,658.
Patented July 23, 1912.
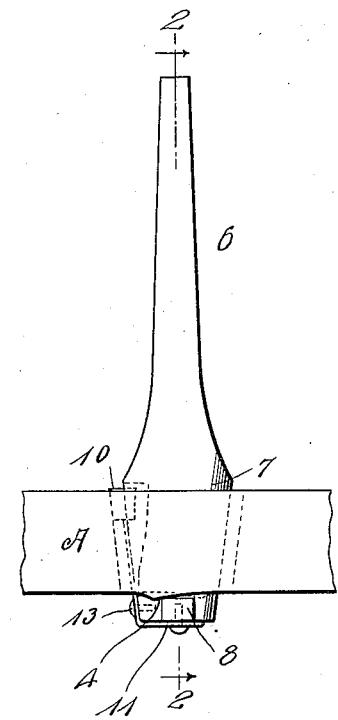
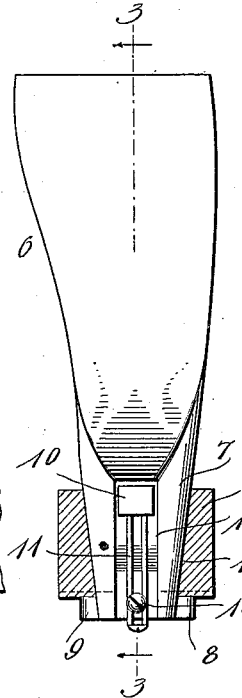
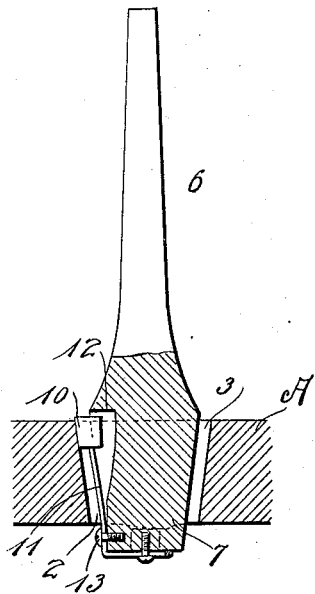
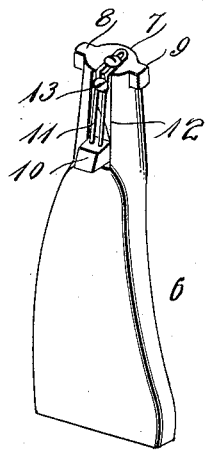
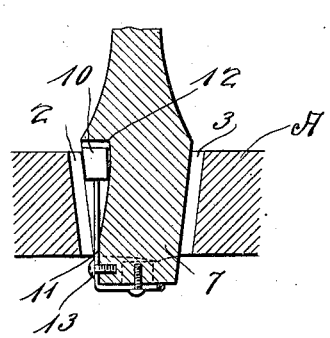
Witnesses
Inventor
T. A. Bateman
Attorneys

UNITED STATES PATENT OFFICE.

THOMAS A. BATEMAN, OF SPOKANE, WASHINGTON.

REMOVABLE TOOTH FOR THRESHING-MACHINE CYLINDERS.

1,033,658.  Specification of Letters Patent.  Patented July 23, 1912.

Application filed October 19, 1911. Serial No. 655,507.

*To all whom it may concern:*

Be it known that I, THOMAS A. BATEMAN, a citizen of the United States, residing at Spokane, in the county of Spokane and State of Washington, have invented certain new and useful Improvements in Removable Teeth for Threshing - Machine Cylinders; and I do declare the following to be a full, clear, and exact description of the invention, such as will enable others skilled in the art to which it appertains to make and use the same.

This invention relates to improvements in detachable teeth for threshing machine cylinders, concaves and the like.

The object of the invention is to provide simple and efficient means for removably securing cylinder and other teeth in their supporting structure, whereby they are held securely against turning and against rattling.

With this and other objects in view, the invention consists of certain novel features of construction, and the combination of parts as will be hereinafter more fully described and afterward specifically claimed.

In the accompanying drawings: Figure 1 represents a side elevation of a tooth constructed in accordance with this invention, the supporting member thereof being broken off for convenience in illustration; Fig. 2 represents a vertical section taken on the line 2—2 of Fig. 1; Fig. 3 is a similar view taken at right angles to the view shown in Fig. 2 and on the line 3—3 of Fig. 2; Fig. 4 is a detail sectional view showing the tooth with its parts in the position which they assume on the removal of the tooth. Fig. 5 is a plan view of the tooth and its supporting member with the parts in operative position; Fig. 6 is a perspective view of the tooth removed from its support.

In the embodiment illustrated, a portion of a threshing machine cylinder bar A is shown equipped with this improved tooth, but it is to be understood that said tooth may be equally well applied to any other apparatus in which such teeth are used. The cylinder bar A or other supporting structure is provided with a plurality of apertures or sockets 1, extending therethrough, the number of sockets corresponding to the number of teeth to be employed. Each of these sockets 1 tapers inwardly and is provided preferably at diametrically opposite points with recesses 2 and 3 which extend the full length of the socket to permit the insertion and removal of the head of the tooth, as will be hereinafter more fully described, and said recesses coöperate with means on the tooth head for locking the tooth against turning when in operative position.

The inner face of the cylinder bar A is provided at opposite sides of each aperture, or socket 1, between the recesses 2 and 3 in the walls of said socket with cam faces 4 and 5 inclined in opposite directions as shown clearly in Figs. 1 and 5. These cam faces are designed for coaction with means on the tooth head to limit the turning movement of the tooth in one direction and to hold it securely in its socket and prevent rattling thereof.

The bodies of the teeth 6 are of ordinary or desired construction, and each tooth is provided with a truncated cone-shaped head or shank 7 of a size to fit within one of the sockets 1 and of a length corresponding substantially with the thickness of the cylinder bar A. Each head is provided at its outer end with oppositely disposed laterally extending lugs 8 and 9 which are designed to enter and slide through the recesses 2 and 3 in the socket walls on the insertion or removal of the tooth and after the tooth has been inserted it is given a quarter turn which causes the lower faces of these lugs to engage the cam faces 4 and 5 of the cylinder bar A, thereby preventing further turning of the tooth and also securely holding it against longitudinal movement in the socket and against wabbling or rattling. The head or shank 7 below the lugs 8 and 9 is of a length equal to the thickness of the cylinder bar A, the larger or base portion thereof, fitting in the larger outer end of the socket 1.

The tooth 6 has secured to one side of its head in a plane between the lugs 8 and 9 a resiliently mounted locking key which is here shown in the form of a block 10, having an inclined or beveled outer face, and secured to one end of a spring 11, the other end of which is bent at right angles and fastened to the outer end of the head 7 as is shown clearly in Fig. 6. The side of the tooth on which said locking key is mounted, is provided with a recess 12 of sufficient depth to permit the block 10 to be housed therein against the tension of its spring to permit the tooth to be readily inserted and removed from its socket. The shank of this spring 11 is preferably secured near the upper end of the tooth by a suitable fastening 13 which limits the outward movement of the block 10. When this tooth is inserted in one of the sockets 1, the lugs 8 and 9 enter the grooves or recesses 2 and 3 in the opposite walls of the socket and the inclined face of the locking key 10, coming in contact with the adjacent wall of the socket, is forced inwardly into the recess 12 in the tooth, thereby permitting the tooth to slide freely within the socket. When the end of the tooth 7 projects beyond the inner end of the socket sufficiently to permit the lower faces of the lugs 8 and 9 to escape the inner face of the cylinder bar A, this tooth is given a quarter turn, which will bring the locking key 10 opposite one of the recesses 2 or 3 in the wall of the socket and when in this position, the spring 11 will cause said key to move outwardly into said recess and securely hold the tooth against turning the lower faces of the lugs 8 and 9 simultaneously engaging the cam faces 4 and 5 on the inner face of the cylinder bar A.

To remove a tooth from its socket the outer end of the key 10, which projects beyond the outer face of the cylinder bar A, is pressed into the recess as shown in Fig. 4, said key being so pressed by the finger of the operator. The tooth is then turned a quarter turn backward to dispose the lugs 8 and 9 in position over the ends of the grooves or recesses 2 and 3 in the side walls of the socket. When the tooth is in this position, the key 10 is held in retracted position by the wall of the socket and the tooth may then be readily withdrawn from the socket.

Various changes in the form, proportion and the minor details of construction may be resorted to within the scope of the claims without departing from or exceeding the spirit of the claimed invention.

It will thus be seen that a tooth constructed as above described may be quickly and easily removed and inserted and when applied is reliably held against accidental detachment.

I claim as my invention:

1. The combination of a tooth-holding member having a socket, and a tooth having a shank for insertion in said socket, the side walls of said tooth and socket being provided with coöperating means for locking said tooth against turning, the locking element of one of said members being resiliently mounted.

2. The combination of a tooth-holding member having a socket therein, and a tooth having a shank for insertion in said socket, one wall of said socket and one side of said shank being provided one with a recess and the other with a yieldably mounted key said key being adapted to engage said recess on the positioning of the tooth in operative position within said socket to prevent the tooth from turning.

3. The combination of a tooth-holding member having a socket therein, and a tooth having a shank for insertion in said socket, one wall of said socket and one face of said shank being provided one with a recess and the other with a yieldably mounted key adapted to engage on the positioning of the tooth in operative position within said socket to prevent the tooth from turning, and coöperating means carried by said tooth and said tooth-holding member to lock said tooth against longitudinal movement and hold it against rattling.

4. The combination of a tooth-holding member having a socket therein provided with a recess in one side wall thereof, and a tooth having a shank for insertion in said socket, a resiliently mounted key carried by said tooth for engagement with the recess in the wall of said socket for locking the tooth against turning.

5. The combination of a tooth-holding member having a socket therein with oppositely disposed grooves in the side walls thereof, the inner surface of said member being provided with cam faces, and a tooth having a shank provided at its free end with oppositely disposed lugs adapted to pass through the grooves in the side walls of the socket and to engage the cam faces of the tooth-holding member for locking said tooth in operative position, said tooth having a recess in one face thereof, a resilient locking key mounted in said recess and adapted to project normally beyond the face of said tooth and to engage one of the grooves of said socket to lock the tooth against turning.

In testimony whereof I have hereunto set my hand in presence of two subscribing witnesses.

THOMAS A. BATEMAN.

Witnesses:
F. L. HAINES,
FLORENCE E. LOTZ.